Figure 1:
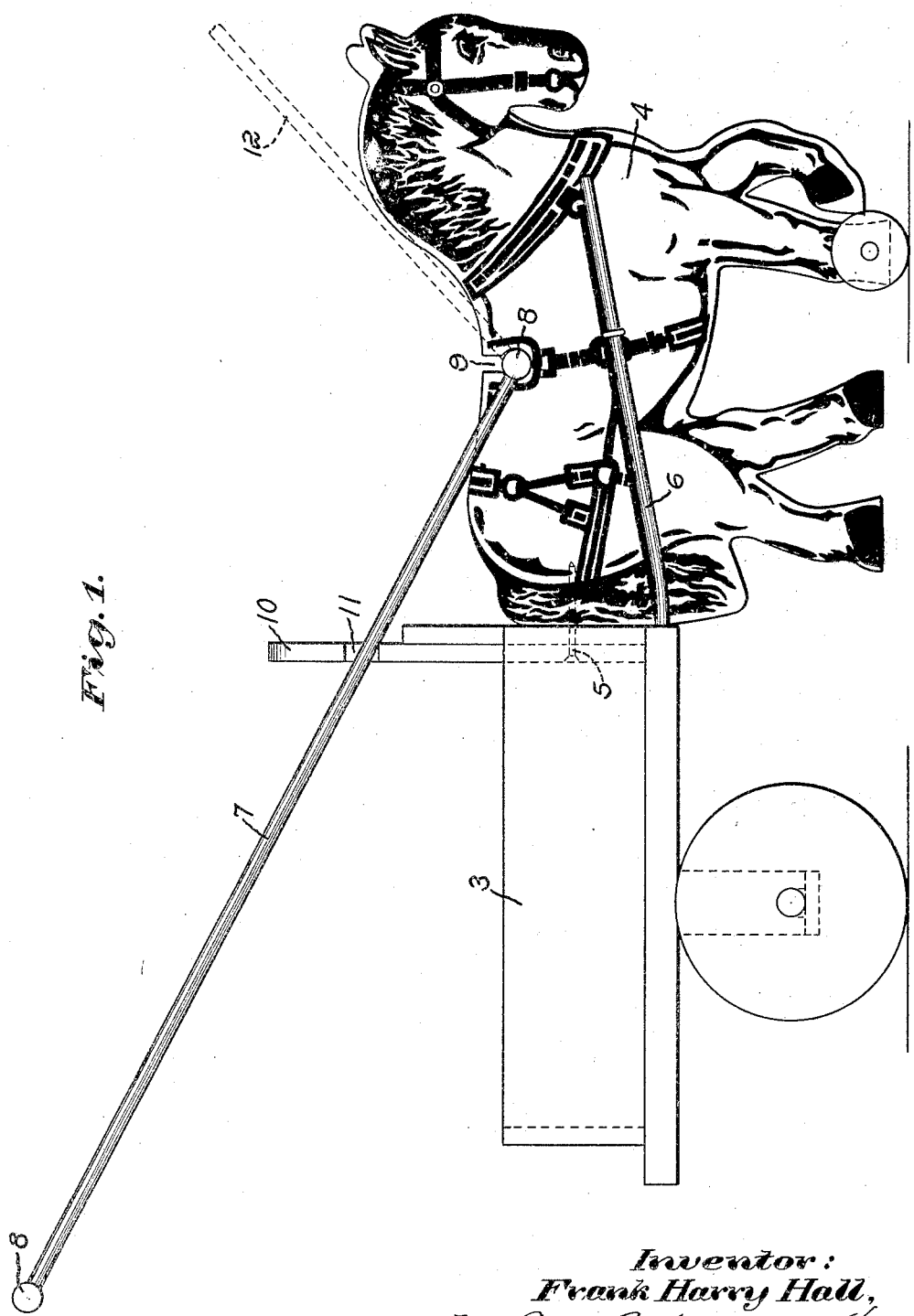

F. H. HALL.
TOY.
APPLICATION FILED NOV. 4, 1918.

1,349,337.

Patented Aug. 10, 1920.
2 SHEETS—SHEET 2.

Inventor:
Frank Harry Hall,
by Emery, Booth, Janney & Varney
Attys

UNITED STATES PATENT OFFICE.

FRANK HARRY HALL, OF YONKERS, NEW YORK.

TOY.

1,349,337.

Specification of Letters Patent.  Patented Aug. 10, 1920.

Application filed November 4, 1918. Serial No. 260,987.

*To all whom it may concern:*

Be it known that I, FRANK HARRY HALL, a citizen of the United States, and a resident of Yonkers, in the county of Westchester and State of New York, (whose post-office address is No. 7 Prospect Drive, Yonkers, New York,) have invented an Improvement in Toys, of which the following description, in connection with the accompanying drawings, is a specification, like characters on the drawings representing like parts.

This invention pertains to improvements in toys, and more particularly, though not exclusively, to improvements in toy horses and wagons.

In the drawings, which show a preferred form of my invention:—

Figure 2:
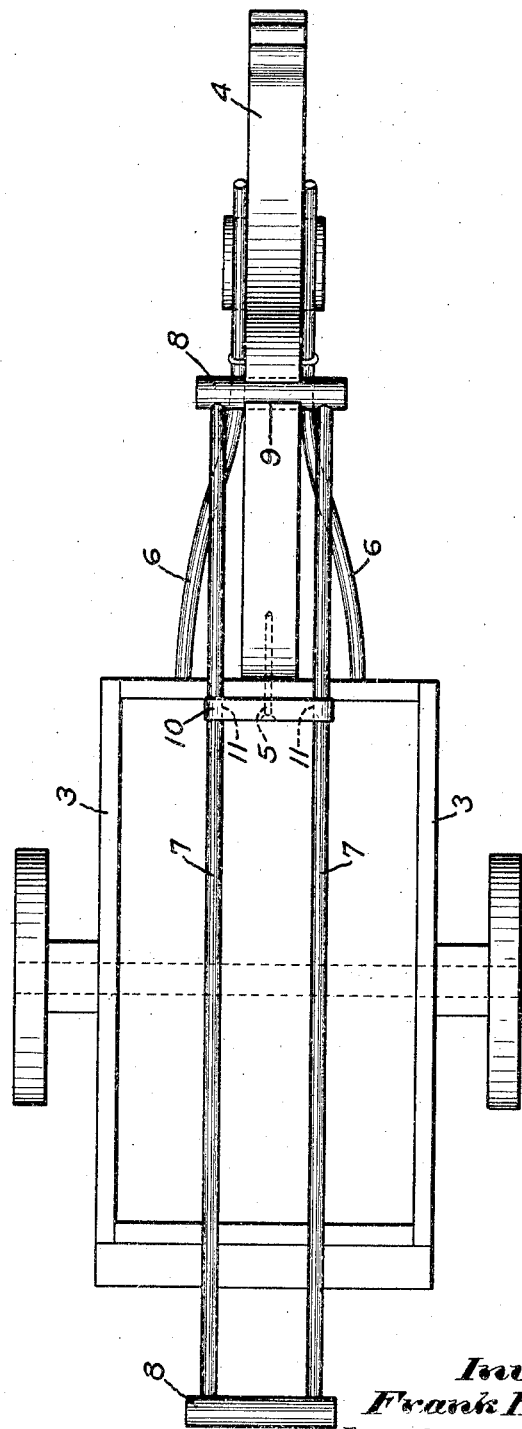

Figure 1 is a side elevation of a toy constituting one embodiment of my invention; and Fig. 2 is a plan view thereof.

Referring to the drawings, I have shown an illustrative cart 3 to which is attached a horse 4, preferably rigid as shown by a securing means typified by the nail 5. I preferably stiffen the construction and add to the attractive appearance thereof by providing shafts 6—6 connected to the horse and cart in any suitable manner, and preferably formed of bent withes.

For manipulation of the toy by the child I have provided rigid reins 7—7, which are preferably connected together at their ends by rigid cross pieces 8—8. The reins are preferably connected to the horse by axially entering one of the cross pieces 8 in a hole in the horse's back, the hole being slotted at 9 to permit the passage therethrough of one of the reins. Where, as is preferably the case, the cross pieces are of larger cross section than the reins, connection and disconnection can only be effected voluntarily by relative lateral movement of horse and reins during alinement of a cross piece 8 with the hole and of the reins with the slot 9.

The front of the wagon 3 is preferably provided with a projection 10 having provision for engaging the reins 7. Such engagement preferably is effected as shown by springing apart the reins 7 and moving the same downwardly into position to engage notches 11 in the sides of the upright.

When thus connected, the toy may be pushed, tipped or turned in any desired manner by force exerted in appropriate directions on the reins which are, for the nonce, substantially rigid with the horse and cart.

When desired to pull the toy, the reins may be sprung out of the notches 11 and swing forwardly to any desired position, such for instance as is shown in dotted lines 12—12.

While I have shown and described one embodiment of my invention, it will be understood that changes therein involving omission, substitution, alteration and duplication of parts may be made within the scope of the appended claims, without departing from my invention.

Claims:

1. A toy horse and cart comprising, in combination, a horse and cart rigidly secured together, rigid reins pivotally connected to the horse and means for rigidly but detachably securing said reins to said cart to prevent pivotal movement thereof.

2. A toy horse and cart comprising, in combination, a horse, a cart, a pair of rigid reins rigidly secured together at their ends, means connecting one end of said reins to the horse and means for connecting an intermediate portion of said reins to the cart.

3. A toy horse and cart comprising, in combination, a horse, a cart, a pair of rigid reins rigidly secured together at their ends, means connecting one end of said reins to the horse and means including a projection over which said reins may be sprung for connecting an intermediate portion of said reins to the cart.

4. A toy horse having rigid reins comprising a pair of rigid longitudinal members connected at their ends by rigid cross pieces and means providing for connecting or disconnecting said reins from the horse by moving said reins transversely of the horse while holding said longitudinal members at a predetermined angle relative to said horse.

In testimony whereof, I have signed my name to this specification.

FRANK HARRY HALL.